Patented June 14, 1932

1,863,426

UNITED STATES PATENT OFFICE

GEORG WALTER, OF VIENNA, AUSTRIA, ASSIGNOR TO I. G. FARBENINDUSTRIE AKTIEN-GESELLSCHAFT, OF FRANKFORT-ON-THE-MAIN, GERMANY, A CORPORATION OF GERMANY

PROCESS FOR THE PRODUCTION OF ARTIFICIAL MASSES

No Drawing. Application filed November 25, 1927, Serial No. 235,743, and in Austria November 28, 1925.

This invention relates to the production of valuable bases for varnishes and of other hard artificial masses, particularly such varnish bases and other artificial masses as are transparent like glass, from monomethylol urea, dimethylol urea, the corresponding thio ureas and similar derivatives and mixtures thereof.

I have found that the fusion of the said derivatives of urea, which are hereinafter referrred to as methylol derivatives of urea, leads to clear, transparent masses of glass like appearance under certain determined conditions of working. In order to obtain this result it is necessary that the initial material is carefully heated as quickly as possible to the fusion temperature, that is 126° C. in the case of dimethylol urea and 111° C. in the case of monomethylol urea, while avoiding any superheating, and is further heated, after fusion, only for a short time, until it becomes viscous, but may still be readily cast, while taking care that the temperature does not exceed 140° C., but preferably employing temperatures between 120° and 140° C., to avoid the occurrence of turbidity of the product. The reaction takes place with water and formaldehyde being split off.

In the said heat treatment after fusion violent frothing takes place during the reaction, and moreover difficulties arise especially in uniformly heating large amounts of initial material, while nevertheless avoiding superheating. I have found that these difficulties are obviated by the addition of fluxing agents i. e. substances capable of lowering the melting point of the initial material, thus enabling the fusion to be carried out more slowly and also the subsequent heating to be carried on for longer periods. The addition of the said fluxing agents also permits the heating of the products after fusion to higher temperatures i. e. to temperatures considerably above the melting point of the pure initial products, than the products obtained from pure initial materials can be heated. As fluxing agents a great variety of non-acid substances may be added, for example neutral or more suitably alkaline salts, even such salts as contain water of crystallization, or hygroscopic salts, such as sodium acetate, sodium formate or calcium chlorid. For example, an addition of sodium acetate to pure monomethylol urea may reduce its melting point by 20° C. or more, according to the quantity added. Instead of the said substances it is often preferable to use neutral mixtures of salts and acids (e. g. an acetate plus glacial acetic acid). An addition of substances chemically related to the initial material, for example urea or thiourea, or another methylol compound than the one used as initial material also acts very favorably in lowering the melting point and keeping the melt clear. Also other compounds, e. g. such as contain amino or hydroxyl groups, may be used, for example, acetamide or phenol, and in some cases also very small quantities of alcohols, for example glycerol, benzyl alcohol and the like.

Whether monomethylol urea, or dimethylol urea are used alone or in mixtures and with or without the addition of substances reducing the melting point, a thin flowing melt is first obtained to which a stabilizing agent is added, which agent should, in the case of monomethylol urea as starting material, preferably show alkaline, and in the case of dimethylol urea as the initial material, preferably show acid reaction. The stabilizing agent may either exhibit the said reaction from the beginning, or substances may be used which form bases or acids only in the course of the reaction. The stabilizing agent, which after the melt has been heated until it becomes viscous, but so that it may still readily be cast, may again be neutralized, prevents in any case, also on further heating to higher temperatures, the formation of white turbid products.

I have further found that an addition of formaldehyde, for example in the form of paraformaldehyde, frequently in a very small quantity, effects the complete and continuous clarity of the product by chemical reaction and facilitates its further treatment and also makes it more supple. When employing monomethylol urea as initial material, preferably larger quantities of formaldehyde up to equal molecular quantities or such amounts as correspond to the formation of methylol methylene urea are added, in which cases it is advantageous to avoid the use of an alkaline stabilizer or even to add an acid stabilizing agent. The aforementioned larger quantities of formaldehyde lead to the formation of water-soluble products, which may be used as bases for the production of water varnishes. If, however, the excess of added formaldehyde be converted into insoluble compounds by the addition of other substances reacting therewith such as phenols, urea, further amounts of monomethylol urea and the like, the solubility of the products in water is diminished.

Similar to the reaction sometimes taking place when adding formaldehyde to monomethylol urea, with the formation of methylol methylene urea, interaction may also be caused between mono- and dimethylol urea in equal molecular proportion forming the same product. Clear masses of glass-like appearance are obtained also by this manner of working.

The salts and neutral salt-acid-mixtures aforementioned as fluxing agents may often be added as stabilizers to the melt of the pure initial material, preferably in combination with formaldehyde and thiourea, instead of the stabilizing agent.

Since the fusion process is carried out in the absence of any solvent, particularly of water, the water formed during the reaction itself and the formaldehyde separated or the excess of the latter can escape in the nascent state at the high temperatures used. In this way quite waterproof and resistant products are obtained.

The process enables products to be obtained of different consistency and properties—fluid, semi-solid, elastic and very hard masses of glass-like, slightly turbid or porcelain-like appearance. The fused masses may be mixed with suitable inorganic or organic filling materials, such as asbestos, wood meal, kieselguhr, cellulose esters and ethers, natural or artificial resins and the like. They may be dissolved by heating them with water or suitable organic solvents such as alcohols, ethers, ketones and the like, for producing varnishes. The melt may be poured into cold liquids such as water or methanol and washed therewith, whereby the added substances and any disturbing by-products can be removed. It may be cast directly into moulds and hardened at temperatures between about 60 and 110° C. with or without pressure. When hardening the reaction products at temperatures up to about 125° C. they can be pulverized and then be pressed and moulded. The whole process or a particular part of the process, for example, the fusion process, may also be carried out in a closed vessel.

It is of great importance in the present process to use an initial material of a well-defined melting point, but the methods hitherto known for the production of pure monomethylol and dimethylol urea and derivatives thereof are not suitable for the production on a commercial scale.

I have found that the said compounds can easily be obtained in a pure, crystalline form when acting on urea and derivatives thereof with formaldehyde in solvents in which the reaction products are not any more altered or in which they are only difficultly soluble in the cold. Contrary to the hitherto known processes, the reaction is a reaction by precipitation and therefore has all the advantages of such a reaction. Thus for example, in the production of methylol compounds of urea, which are easily soluble in water, non-aqueous formaldehyde and urea are caused to react in suitable proportions in an organic solvent, such as alcohols, for example, methyl-alcohol, ethyl-alcohol, benzyl-alcohol and the like.

If the formaldehyde is not free from acid, as is usually the case, the reaction must be effected in the presence of a base, for example, caustic alkalies, whereby solid polymerized formaldehyde, for example paraformaldehyde or trioxymethylene, which is insoluble in alcohol per se, easily passes into solution. During the further reaction the bases have an accelerating effect as condensing agents. Their rapid neutralization is not necessary, as it would be when carrying out the reaction in aqueous solution, because, disregarding the fact that the reaction product is withdrawn from their further action by precipitation, the reaction takes place under different and milder conditions owing to the lower degree of ionization of the base in the organic medium. Further, the products themselves are much more difficultly altered in the organic medium than in water. The reaction proceeds with moderate disengagement of heat and is preferably carried out at room temperature. According to the temperature and the quantity of the condensing agent used, the reaction product precipitates immediately or after some time. The precipitation may be caused or completed by the addition of organic liquids, in which the methylol compounds, even when heated, are insoluble, for example, ether, carbon tetrachlorid and others. It is not necessary, that the alcohols used are entirely free from water, but it is preferable to use alcohols of high strength. The yield is almost quantitative. The formaldehyde may be used in the form of gas or dissolved in organic solvents or in solid or polymerized form, or in the form of substances splitting off formaldehyde.

The following examples will further illustrate the nature of the said invention, but the invention is not limited thereto. The parts are by weight.

*Example 1*

200 parts of paraformaldehyde are introduced into a solution of 5 parts of caustic potash in 1100 parts of commercial ethyl alcohol of about 94 per cent strength. The mixture cools, whilst the paraformaldehyde passes into solution. After the paraformaldehyde has been dissolved, which process can be accelerated by heating, 200 parts of urea are added to the cold solution, which also soon pass into solution. After a short time the separation of crystallized dimethylol urea sets in, which is complete after some hours. The substance is separated from alcohol, purified and dried and thus easily obtained with the clear melting point of 126° C.

*Example 2*

50 parts of urea are dissolved in 80 parts of methylalcohol of about 99 per cent strength containing one to two parts of caustic soda. 26.3 parts of trioxymethylene are added to the solution. As the formaldehyde has a dissolving action on the urea and vice versa, further amounts of urea and paraformaldehyde can be added repeatedly to the solution one after the other thus considerably concentrating the solution. The precipitated product is monomethylol urea of the melting point 111° C.

*Example 3*

200 parts of paraformaldehyde are dissolved in 400 parts of methyl alcohol of about 99 per cent strength containing 5 parts of caustic soda, and 200 parts of urea are added. After some time nearly the theoretical amount of dimethylol urea is precipitated while the temperature slightly rises.

*Example 4*

130 parts of trioxymethylene are dissolved in 316 parts of methanol while adding 3 parts of a 50 per cent solution of caustic potash. 152 parts of thiourea and 12 parts of a 50 per cent solution of caustic potash are then added. After a short time a separation of resinous dimethylol thiourea is obtained, which solidifies after digesting it several times with acetone and can then easily be filtered off, dried and pulverized.

*Example 5*

Pure dimethylol urea is fused within about one minute at 126° C. in an apparatus provided with heating coils and stirring mechanism, whereby a violent formation of formaldehyde is observed. A little chloracetic acid (about ⅓%) is added to the clear melt, whereupon the mass rapidly thickens. The reaction product is cast into moulds and, if desired, further heated for a short time under pressure, whereupon the glass clear product can be removed from the mould and is then subjected to further hardening, by the action of the heat, if desired.

*Example 6*

Pure monomethylol urea is placed into an apparatus as described in Example 5, heated as quickly as possible to its fusion temperature of 111° C., and a small quantity of concentrated caustic soda solution (about 1 per cent) is added to the clear melt, whereupon the mass thickens on further heating nearly to gelatinization. The transparent product exhibits a slight opalescence after hardening.

*Example 7*

Monomethylol urea containing 2 per cent of sodium acetate is fused after addition of about 1 per cent of caustic soda dissolved in a small quantity of water. A considerable reduction of the melting point takes place. The mixture is heated until the melt becomes clear and finally gelatinizes. The glass-clear product which after cooling or partial hardening may be easily pulverized is moulded or pressed while heating.

*Example 8*

A mixture of 60 parts of dimethylol urea, 60 parts of monomethylol urea, 10 parts of paraformaldehyde and about 1 per cent of potassium formate is fused within 3–6 minutes, and is further heated until the melt becomes viscous, but may still readily be cast, after addition of so much acid that the melt shows weakly acid reactions. The melt obtained is cast directly into moulds; or it is first washed and after removing the washing liquid, if desired in vacuo, a glass-clear, hard product is produced by a heat treatment; or the melt is dissolved, for instance, in glycol mono-ethyl ether and can then be used as varnish base.

*Example 9*

A mixture of 100 parts of dimethylol urea, 16 parts of thio urea, 2 parts of sodium acetate and 3 parts of paraformaldehyde is fused in 10–15 minutes (the melting point of the mixture is about 105° C.), and the melt, after the temerature has temorarily risen to about 130° C.—also without the addition of acid— is heated until the glass-clear mass has thickened sufficiently. The further treatment is effected as indicated in Example 8.

If the quantity of paraformaldehyde is considerably increased up to about 20 parts, a clear intermediate product is obtained which is soluble in water and can be used as a base for producing water varnishes.

Instead of paraformaldehyde other polymeres of formaldehyde or formaldehyde separating substances (for example hexamethylene tetramine) or gaseous or dissolved formaldehyde or other aldehydes may be used.

*Example 10*

90 parts of monomethylol urea are intimately mixed with 1 part of sodium acetate preferably in combination with some glacial acetic acid and 12 parts of thiourea and fused in an open vessel. The mixture may be heated quite gradually to the fusion point, which is at about 95° C. When all has been fused, which is the case after about 20 minutes and the self-condensation of the monomethylol urea proceeds under rise of the temperature to about 110° C., about 30 parts of paraformaldehyde are added by portions and the mass, which eventually still froths (in case no salt acid-mixture and thiourea have been used, after addition of a small quantity of phosphoric acid, if desired) is heated for a few more minutes in the open vessel. Thereupon the mass can be cast into moulds or, if an acid has been added after its neutralization, may be further heated for some time. Instead of casting it into moulds and hardening it at about 60–110° C., it may previously be washed as described in Example 8. By treating the melt for a longer time at 110° C., a hard brittle product is obtained on cooling, which can be pulverized into a powder without trouble. The powder is heated to about 120° C. and pressed in the hot press preferably at temperatures between 100–200° C., and using pressures which according to the quality of the mass may rise up to 2000 atmospheres.

*Example 11*

30 parts of dimethylol urea mixed with 5 parts of thiourea, 3 parts sodium bromid and 1 part of sodium formate are fused at about 100° C., and further heated after the addition of 1 part of formaldehyde and, if desired, a little phosphoric acid. The product which sometimes is slightly turbid due to undissolved or separated salt is thoroughly washed with water while cold, whereupon it is further treated to form a glass clear mass according to Example 8.

What I claim is:

1. The process for the production of clear, transparent artificial masses which comprises carefully heating a methylol derivative of urea in the absence of any solvent as quickly as possible at least to the melting point, while avoiding any superheating, and further heating the melt until it is viscous but may still be cast.

2. The process for the production of clear, transparent artificial masses which comprises condensing urea and formaldehyde in an organic solvent substantially free from water to produce a product selected from the class consisting of mono-methylol urea and dimethylol urea, separating the pure methylol derivative of urea and carefully heating it in the absence of any solvent as quickly as possible at least to its melting point, while avoiding any superheating, and further heating the melt until it is viscous but may still be cast.

3. The process for the production of clear, transparent artificial masses which comprises condensing urea and formaldehyde in an organic solvent substantially free from water in the presence of a non-acid condensing agent to produce a product selected from the class consisting of monomethylol urea and dimethylol urea, separating the pure methylol derivative of urea and carefully heating it in the absence of any solvent as quickly as possible at least to its melting point, while avoiding any superheating, and further heating the melt until it is viscous but may still be cast.

4. The process for the production of clear, transparent artificial masses which comprises condensing urea and formaldehyde in an organic solvent substantially free from water in the presence of a non-acid condensing agent to produce a product selected from the class consisting of mono-methylol urea and dimethylol urea, precipitating the resulting product by the addition of an organic liquid which does not dissolve the said product, separating and then carefully heating said product in the absence of any solvent as quickly as possible at least to its melting point, while avoiding any superheating, and further heating the melt until it is viscous but may still be cast.

5. The process for the production of clear, transparent artificial masses which comprises condensing urea and formaldehyde in an organic solvent substantially free from water in the presence of a non-acid condensing agent to produce a product selected from the class consisting of mono-methylol urea and dimethylol urea, precipitating the resulting product by the addition of ethyl ether, separating and then carefully heating said product in the absence of any solvent as quickly as possible at least to its melting point, while avoiding any superheating, and further heating the melt until it is viscous but may still be cast.

6. The process for the production of clear, transparent artificial masses which comprises carefully heating a methylol derivative of urea in the absence of any solvent as quickly as possible at least to the melting point and with the addition of a non-acid fluxing agent, while avoiding any superheating, and further heating the melt until it is viscous but may still be cast.

7. The process for the production of clear, transparent artificial masses which comprises carefully heating a methylol derivative of urea in the absence of any solvent as quickly as possible at least to the melting point, while avoiding any superheating, further heating the melt until it is viscous but may still be cast and hardening the reaction product by heating it at temperatures between 60° and 110° C.

8. The process for the production of clear, transparent artificial masses which comprises carefully heating a methylol derivative of urea in the absence of any solvent as quickly as possible at least to the melting point, while avoiding any superheating, further heating the melt until it is viscous but may still be cast and hardening the reaction product by heating it at temperatures between 60° and 110° C., pulverizing the hardened mass and pressing the powder obtained in a hot press.

9. The process for the production of clear, transparent artificial masses which comprises carefully heating dimethylol urea in the absence of any solvent as quickly as possible at least to 126° C. and continuing the heating to a temperature not higher than 140° C. until the melt is viscous but may still be cast.

10. The process for the production of clear, transparent artificial masses which comprises carefully heating dimethylol urea with the addition of a nonacid fluxing agent, but in the absence of any solvent as quickly as possible at least to 126° C. and continuing the heating to a temperature not higher than 140° C. until the melt is viscous but may still be cast.

11. The process for the production of clear, transparent artificial masses which comprises carefully heating dimethylol urea with the addition of a polymer of formaldehyde and of a non-acid fluxing agent, but in the absence of any solvent as quickly as possible at least to 126° C. and continuing the heating to a temperature not higher than 140° C. until the melt is viscous but may still be cast.

12. The process for the production of clear, transparent artificial masses which comprises carefully heating dimethylol urea, an alkali metal formate and paraformaldehyde, but in the absence of any solvent as quickly as possible at least to 126° C. and further heating the melt until it is viscous but may still be cast.

13. The process for the production of clear, transparent artificial masses which comprises carefully heating dimethylol urea with the addition of thiourea, an alkali metal formate and paraformaldehyde, but in the absence of any solvent as quickly as possible at least to 126° C. and continuing the heating to a temperature not higher than 140° C., until the melt is viscous but may still be cast.

14. The process for the production of clear, transparent artificial masses which comprises carefully heating dimethylol urea with the addition of thiourea, an alkali metal formate and paraformaldehyde, but in the absence of any solvent as quickly as possible at least to 126° C. and continuing the heating to a temperature not higher than 140° C., until the melt is viscous but may still be cast, hardening the reaction product by heating it at temperatures between 60° and 110° C., pulverizing the hardened mass and pressing the powder obtained in a hot press.

15. The process for the production of clear, transparent artificial masses which comprises carefully heating mono-methylol urea in the absence of any solvent as quickly as possible at least to about 111° C., and then further heating the melt to a temperature between 120° and 140° C. until it is viscous but may still be cast.

16. The process for the production of clear, transparent artificial masses which comprises carefully heating mono-methylol urea with the addition of a non-acid fluxing agent, but in the absence of any solvent as quickly as possible at least to about 111° C. and further heating the melt until it is viscous but may still be cast.

17. The process for the production of clear, transparent artificial masses which comprises carefully heating mono-methylol urea in the absence of any solvent as quickly as possible at least to the melting point and with the addition of a non-acid fluxing agent, while avoiding any superheating, and further heating the melt until it is viscous but may still be cast, an aldehyde being added during the process.

18. The process for the production of clear, transparent artificial masses which comprises carefully heating mono-methylol urea together with a polymer of formaldehyde in the absence of any solvent as quickly as possible at least to the melting point, while avoiding any superheating and with the addition of a non-acid fluxing agent and further heating the melt until it is viscous but may still be cast.

19. The process for the production of clear, transparent artificial masses which comprises carefully heating mono-methylol urea together with a polymer of formaldehyde and thiourea and with the addition of a non-acid fluxing agent, but in the absence of any solvent as quickly as possible at least to about 111° C. and further heating the melt until it is viscous but may still be cast.

20. The process for the production of clear, transparent artificial masses which comprises carefully heating mono-methylol urea together with a polymer of formaldehyde and together with sodium acetate and thiourea in the absence of any solvent as quickly as possible at least to about 111° C. and further heating the melt until it is viscous but may still be cast.

21. The process for the production of clear, transparent artificial masses which comprises carefully heating mono-methylol urea together with a polymer of formaldehyde and together with sodium acetate and thiourea in the absence of any solvent as quickly as possible at least to about 111° C., while avoiding any superheating, further heating the melt until it is viscous but may still be cast, hardening the reaction product by heating it at temperatures between 60° and 110° C., pulverizing the hardened mass and pressing the powder obtained in a hot press.

In testimony whereof, I affix my signature.

Dr. GEORG WALTER.